United States Patent [19]

Kobayashi

[11] 3,806,816

[45] Apr. 23, 1974

[54] PULSE CODE MODULATED SIGNAL SYNCHRONIZER

[75] Inventor: Herbert S. Kobayashi, Webster, Tex.

[73] Assignee: The United States of America as represented by the Administrator of the National Aeronautics and Space Administration, Washington, D.C.

[22] Filed: Nov. 8, 1972

[21] Appl. No.: 304,705

[52] U.S. Cl. .................................. 325/321, 325/419
[51] Int. Cl. .................................................. H04b 1/16
[58] Field of Search ........... 325/39, 41, 44, 58, 419, 325/420, 60, 69, 321, 324, 320; 178/68, 69.5 R, 67, 88; 179/15 BS; 340/174.1 H

[56] References Cited

UNITED STATES PATENTS

| | | | |
|---|---|---|---|
| 3,646,546 | 2/1972 | Norris | 178/68 X |
| 3,675,129 | 7/1972 | Melvin | 178/67 X |
| 3,691,467 | 9/1972 | Mansfield et al. | 325/60 X |
| 3,557,308 | 1/1971 | Alexander et al. | 178/69.5 R |

*Primary Examiner*—Robert L. Griffin
*Assistant Examiner*—A. M. Psitos
*Attorney, Agent, or Firm*—Marvin J. Marnock; John R. Manning; Marvin F. Matthews

[57] ABSTRACT

A bit synchronizer for a split phase PCM transmission which has first and second loop systems which respectively receive incoming phase coded PCM signals. In the first loop system the incoming bit signals are simultaneously supplied to two channels which alternately receive a generated, phase coded bit signal representative of a binary digit, and the generated bit signal is multiplied with the incoming bit signals. The multiplied signals are respectively integrated and held. When the incoming signal is properly phase locked with the generated bit signal, each channel will produce an integrated value which increases (either positively or negatively) over the entire bit period of the generated bit signal. The channels are respectively sampled at the end of one bit period and at the beginning of the following bit period. The sampled signals are supplied to a bit lock detector. If the bit period of the incoming signal is properly synced to the bit period of the supplied digit, the bit lock detector produces no output. If the bit periods are 180° out of phase, an error signal is produced to change the phase of the generated signal by 180°. In the second loop system the incoming bit signals are simultaneously supplied to two channels which alternatively receive a phase coded signal representative of a binary digit but phase shifted by 90° with respect to the first generated signal. The phase shifted signal is multiplied with incoming bit signals to null the phase and frequency of the generated signal in a phase locked relationship to the incoming signal where the phase lock can be either 0° or 180°. A counter means is used for timing of the generated signals and timing of sample intervals for each bit period so that the characteristics of the loops during the sample intervals are used as control signals until a 0° phase locked condition is reached.

8 Claims, 9 Drawing Figures

PULSE CODE MODULATED SIGNAL SYNCHRONIZER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to pulse code synchronizers and, more particularly, to pulse code synchronizers for timing split phase bits for decoding.

Transmission of data involves the choice of a medium or the actual data link and the choice of a format or the code for the transmitted intelligence. The medium for data transmission depends to a large extent on the physical location of the two devices. Where the devices are relatively close to one another, electrical or mechanical means are used. Long distance transmissions are usually accomplished by "radio" which includes all forms of transmission that make use of the principles of electromagnetic radiation such as television, microwave, and radar. In a radio transmission there are typically two components — the carrier wave and the intelligence (or data) signal which is incorporated into the carrier wave. The combining of the carrier wave and the data information for transmission is called modulation and, at the receiving station, the data information is separated from the carrier wave by a process called demodulation.

There are many ways or techniques or combining data information and carrier waves. The present invention concerns itself with the demodulation of a pulse-train carrier with a pulse code and, more particularly, a split phase pulse code modulation. Modulation of a pulse carrier and pulse code is sometimes abbreviated as "PCM." The pulse code is typically in a digital format where a series of binary digits ("0" or "1") or bits comprise a "word" or data report and a number of words form a "frame" which is a cycle of data compilation.

As an example of PCM transmission, a subcarrier frequency can be 8,192 Hz. A suitable format is a single "frame" (a cycle of data compilation) at a rate of 1 Hz where each frame carriers 32 "words" (a data report). Each word can have a reporting capacity of eight "bits" (a digital value). Thus, with this example there is a bit rate of 256 bits per second. In this format the first and second words of a frame contain a 16-bit frame synchronizing code while the remaining words carry data information. For demodulation, the synchronizer must receive the input signals and synchronize a timing signal with the input signals to minimize the chance of obtaining erroneous information due to noise or intersymbol interference. The synchronizer output can be a serial code with timing signals which are supplied to a decommutator. The decommutator searches for the frame synchronizing pattern and, after acquiring word and frame synchronization, parallel data bits can be decommutated from the serial bit stream of the synchronizer.

SUMMARY OF THE INVENTION

The present invention is embodied in a synchronizer for demodulation of split phase pulse code demodulated signals. In this data processing system, incoming data word signals comprised of pulse code modulated bits are demodulated and then synchronized by a synchronizer having a frequency stabilizing loop system and a phase stabilizing loop system. Incoming word signals having split phase bit coding are applied to each of the loop systems.

In the frequency stabilizing loop system a frequency generating means supplies pulse signals to a counter and logic circuit which, in turn, provides timed outputs which include first and second pulse code modulated output signals each with a 90° time phase shift relative to an in-phase pulse coded modulated signal. These phase shifted, alternating output signals are supplied to an analog multiplier where the generated signals are multiplied with the incoming signals. The multiplication product is integrated and sampled periodically at regular bit time intervals. The multiplication of these signals will produce an error signal if the frequency of the generated signal and the incoming signals are different. The error signal adjusts the frequency generating means to the frequency of the incoming carrier signal. When the frequency of the frequency generating means is established to that of the carrier, there are a number of null points where the error signal to the frequency generating means is stabilized and where the incoming signals and the signals of the frequency generating means are the same. Between the null points for signals at the same frequency, there is a phase error signal for placing the generated signal for a bit in either a 0° or 180° locked phase condition relative to an incoming bit.

The counter and logic circuit which provides a timing function relative to the bit period also supplies the in-phase pulse code modulated signal to the phase sensing loop system. In the phase sensing loop system are two channels, each of which alternately integrates and holds the multiplication product of the incoming bit signal and the in-phase bit signal. Sampling signals supplied from the counter sample each of the loop circuits twice for each bit period. By comparing the sample values just before and just after a timing bit period, it can be determined if the incoming bit is in place with the bit function produced for the loop circuits. If the incoming bit period is not in phase with the generated bit signal, the phase of the generated signal is shifted by 180° to provide an in-phase condition.

DETAILED DESCRIPTION OF THE INVENTION

Figure 1:
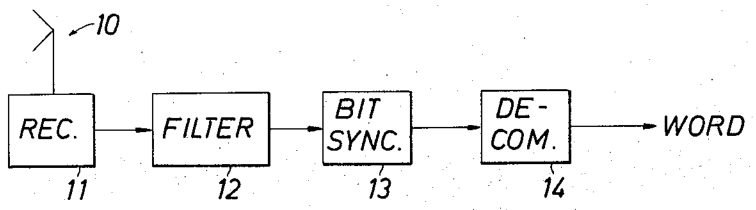
FIG. 1 is a schematic overview of a system embodying the present invention.

Referring to FIG. 1, a station for receiving a radio transmission is schematically illustrated. At the station is an antenna 10 which picks up or detects radio transmission of an electrical signal comprising a Pulse Code Modulated wave train (hereinafter sometimes abbreviated and referred to as "PCM"). The electrical signals are supplied to a receiver 11 for amplification and detection of the incoming signals. A filter 12 further processes the signals to eliminate undesired signals of other frequencies and noise components. In connection with the present invention, the PCM signal consists of characteristic signal where a number of digital "bits" (a binary digit "0" or "1") comprise a word, and a number of words form a "frame" and each frame carries coded information or data for a single measurement scan or cycle.

Relative to the pulse coding, each frame carries various data in a fixed relationship, and the first two words are typically used to synchronize the frame, that is, align the pulse input relative to a time base for correctly interpreting the "0" and "1" bits of each word and frame. The proper decoding of a split-phase PCM signal requires that the group of signals constituting words are properly synchronized. Thus, from the filter 12 an incoming signal is supplied to a bit synchronizer 13 which provides an output signal synchronized to all of the bits of a frame. A decommutator 14 receives a properly synced data frame and if any data appears erroneous it is because the data word is wrong and not because of erroneous detection of the input signal.

Figure 2:
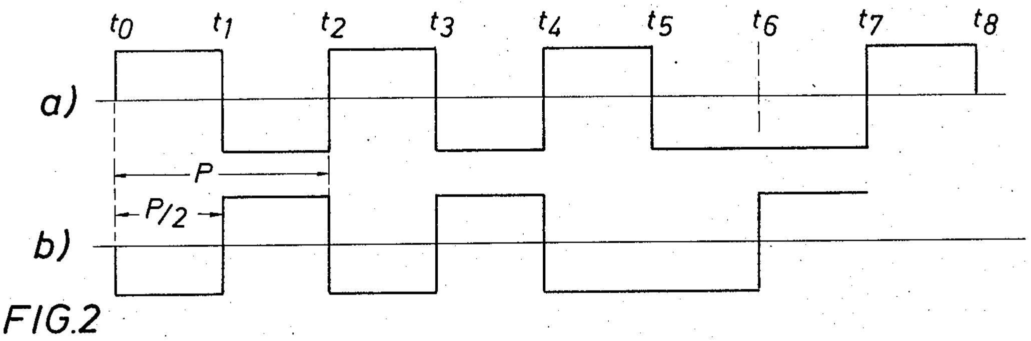
FIG. 2 is a representation of various signal waveforms which are illustrated for explanation purposes.

To illustrate how important synchronization is for this type of decoding, an illustration is provided in FIG. 2. As shown in FIG. 2(*a*), the waveforms between times $t_0$–$t_2$, $t_2$–$t_4$ and $t_4$–$t_6$ illustrate digits of value "1" and the waveform between time $t_6$–$t_8$ illustrates a digit of value "0." These waveforms are for split phase coding, i.e., a "1" value for a bit period "P" has an initial half-bit period P/2 in which the signal is positive relative to last half-bit period. A "0" valve has just the reverse where the initial half-bit period of the signal is negative relative to the last half-bit period.

In FIG. 2(*b*), the waveform as illustrated in FIG. 2(*a*) is shifted to the left by one-half of the bit time period. On a time basis, with the same waveform as in FIG. 2(*a*), the bit representation between times $t_0$–$t_2$ and $t_2$–$t_4$ changes its binary value from a "1" to a "0." The data information between times $t_4$–$t_8$ is lost. Thus, at the receiving station if the bit signals are shifted in phase or time during the detection process, erroneous bit values are produced and bit values are lost.

With the phase coded signal as above described, synchronization of the words is necessary for proper decoding of the signal. Thus, a bit sync circuit 13 (FIG. 1) receives the sync words of a frame and locks the frame in the sync circuit. The decom circuit then receives the bits in proper order and provides the proper "word" output if the data of the bits is correct. In any event, error due to signal shift is eliminated.

A considerable concern for this type of system is that the input synchronizing word is properly synchronized or locked in proper phase relationship so that the resulting output is correctly interpreted. When synchronization of the input word is obtained, it is desirable to "lock" the reception to prevent drift and "jitter" – i.e., the decom need not be required to reset the bit synchronized and thus lose input data.

Before going into the details of the structure embodying the present invention, it may be helpful to consider the mechanics of the process for obtaining the synchronized bit output. The incoming signal represents "0" or "1" digit values in a split phase mode. The synchronizer must detect the signals and provide an output of the "0" and "1" values serially. By taking the input or incoming signal and multiplying it by a generated split phase coded signal having a "1" value at the same frequency and phase relationship as the incoming signal, the "1" and "0" signals in the incoming signal can be detected by virtue of signal levels and be properly decoded. This is called "locking" of the incoming signal in the bit synchronizer. If the generated signal and incoming signal shift relative to one another by 180°, it is possible to falsely lock-in the signals, but in this case the decoding will be erroneous. In the event of a false lock-in, the generated signal is shifted by 180° to an in phase condition so that the proper decoding is obtained. If the frequency between the incoming signal and the generated signal are different, the frequency of the generated signal is adjusted to that of the incoming signal.

Figure 3:
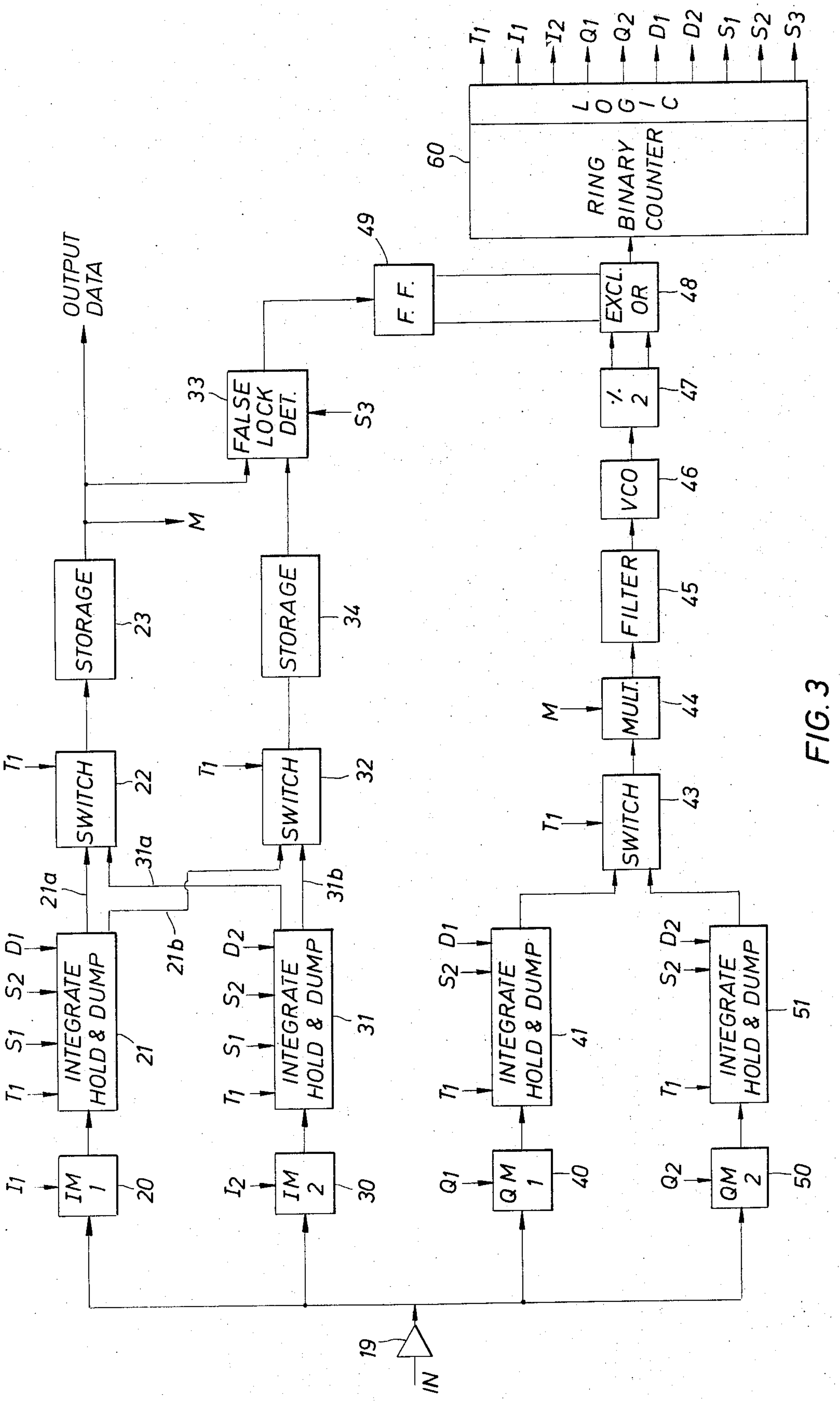
FIG. 3 is a schematic illustration of a circuitry arrangement embodying the present invention.

Referring now to FIG. 3, there is disclosed a bit synchronizing system for signals which are split phase bit coded. The system of FIG. 3 includes a voltage controlled oscillator 46 which generates a reference output frequency signal. A loop control system which controls VCO 46 provides for adjustment of the frequency of the generated signal to that of the incoming signals.

The decoded, serial output of bits which are synced to the generated frequency signal of the VCO 46 are issued from a storage circuit 23.

The phase relationship of the generated and incoming signals are compared by a false lock detector 33 and, if necessary, the phase of generated signal is adjusted by 180° so that the serial output of bits is correctly decoded.

The system is thus involved in adjusting the frequency of a generated signal to be the same as the frequency of an incoming signal, and adjusting the phase of a generated signal to be precisely in-phase with that of an incoming signal for proper decoding.

As illustrated in FIG. 3, a voltage controlled oscillator 46 provides a frequency output signal which can be varied in proportion to an input control error voltage. The output of the VCO 46 is supplied to a divide by two circuit 47 which halves the frequency for phase control purposes which will hereinafter be made more apparent. The output from the divider 47 is supplied to an exclusive OR circuit 48. The OR circuit 48 is controlled by a flip-flop circuit 49 so that the output of the OR circuit 48 can be shifted by 180°. The output of the OR circuit 48 is provided to a ring binary counter and logic circuits 60 which provide timing and control outputs for the loop systems.

As will become apparent from the discussion to follow, two loop circuits are employed for the detection of phase error and two other loop circuits are employed for the detection of false lock error. The first pair of loop circuits have an alternating operation which serves to provide an error signal for the VCO 46 for adjusting the frequency of the generated signal to a locked-in condition with resepct to the incoming signal. The other pair of loop circuits have an alternating operation which serves to provide comparison signals from which the false lock error signal can be derived.

Figure 4:
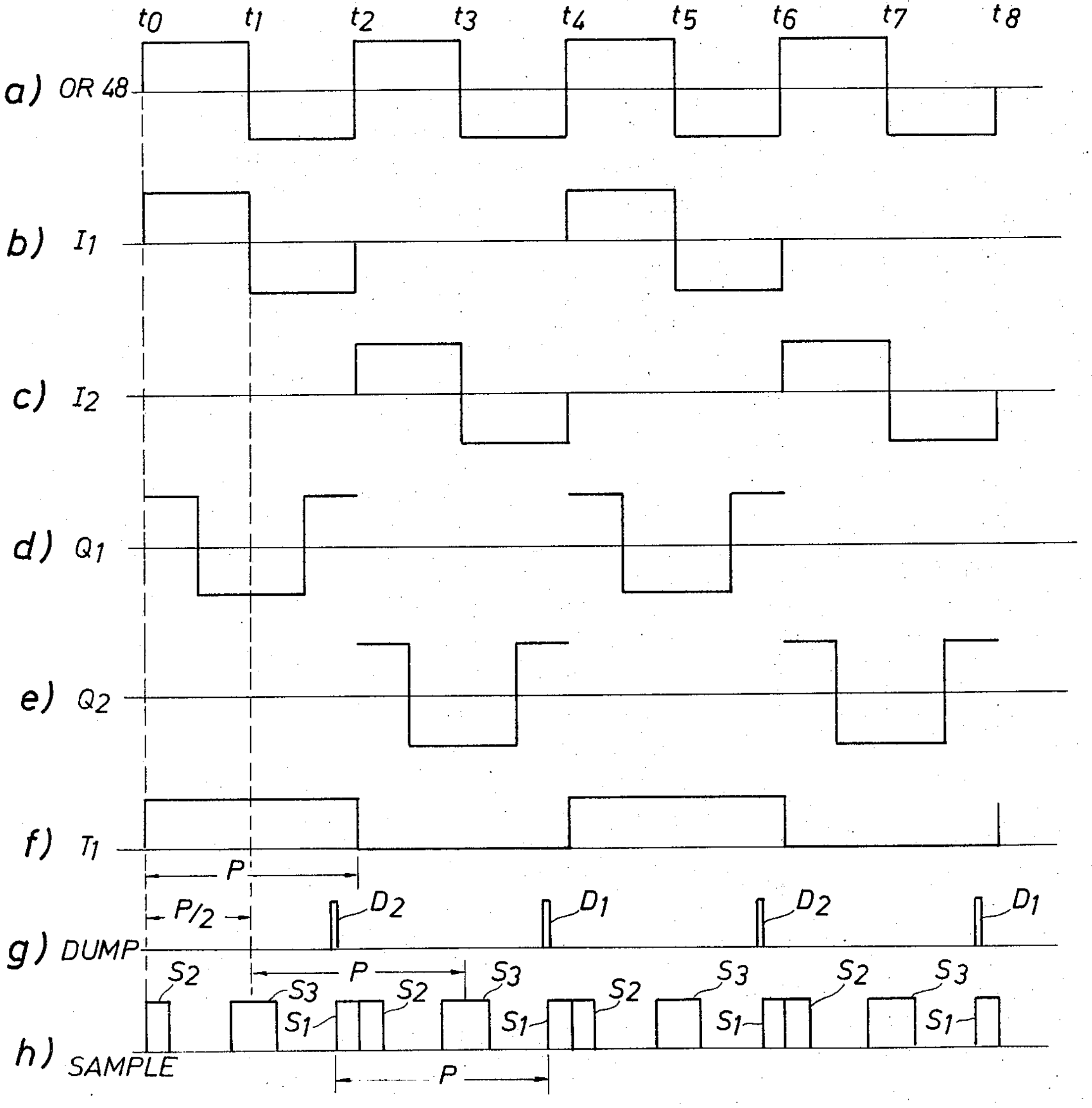
FIG. 4 is a representation of various timing signal waveforms for the circuitry of FIG. 3.

To operate the system, a timing sequence is provided by logic circuit 60. The overall timing sequence is illustrated in FIG. 4 wherein FIG. 4(a) is a representation of an output from the OR circuit 48. The counter and logic circuit 60 provide the following outputs in response to the output from circuit 48:

*a.* a first in-phase alternating signal $I_1$ which is shown in FIG. 4(*b*) as occurring between times $t_0$–$t_2$ and $t_4$–$t_6$ and has a characteristic waveform representative of a "1" digit;

*b.* a second in-phase alternating signal $I_2$ which is shown in FIG. 4(*c*) as occurring between times $t_2$–$t_4$ and $t_6$–$t_8$ and has a characteristic waveform representative of a "1" digit;

*c.* a first quadrature alternating signal $Q_1$ which is shown in FIG. 4(*d*) as occurring between times $t_0$–$t_2$ and $t_4$–$t_6$ and is shifted by 90° relative to the $I_1$ signal;

*d.* a second quadrature alternating signal $Q_2$ which is shown in FIG. 4(*e*) as occurring between times $t_2$–$t_4$ and $t_6$–$t_8$ and is shifted by 90° relative to the $I_2$ signal;

*e.* a timing signal $T_1$ [FIG. 4(*f*)] which is one bit period long and is synchronized in time with the $I_1$ and $I_2$ signals;

*f.* first and second dump signals $D_1$ and $D_2$ [FIG. 4(g)] where the $D_1$ signal and $D_2$ signal alternate for each bit period, and $D_1$ signal being keyed to the bit period following the $I_1$ signal and the $D_2$ signal being keyed to the bit period following the $I_2$ signal — the $D_1$ and $D_2$ signals occurring just prior to the end of a bit period;

*g.* first, second and third sampling pulses $S_1$, $S_2$ and $S_3$ [FIG. 4(h)] where the sampling pulse $S_1$ occurs just prior to the end of a bit period, the sampling pulse $S_2$ occurs just at the start of a bit period, and the sampling pulse $S_3$ occurs intermediate of a bit period.

All of the foregoing pulses are timed or keyed to the $I_1$ and $I_2$ pulse times. Thus, if the OR circuit 48 shifts by 180° then the timing pulses will be shifted by 180°.

Figures 5, 6, 9:
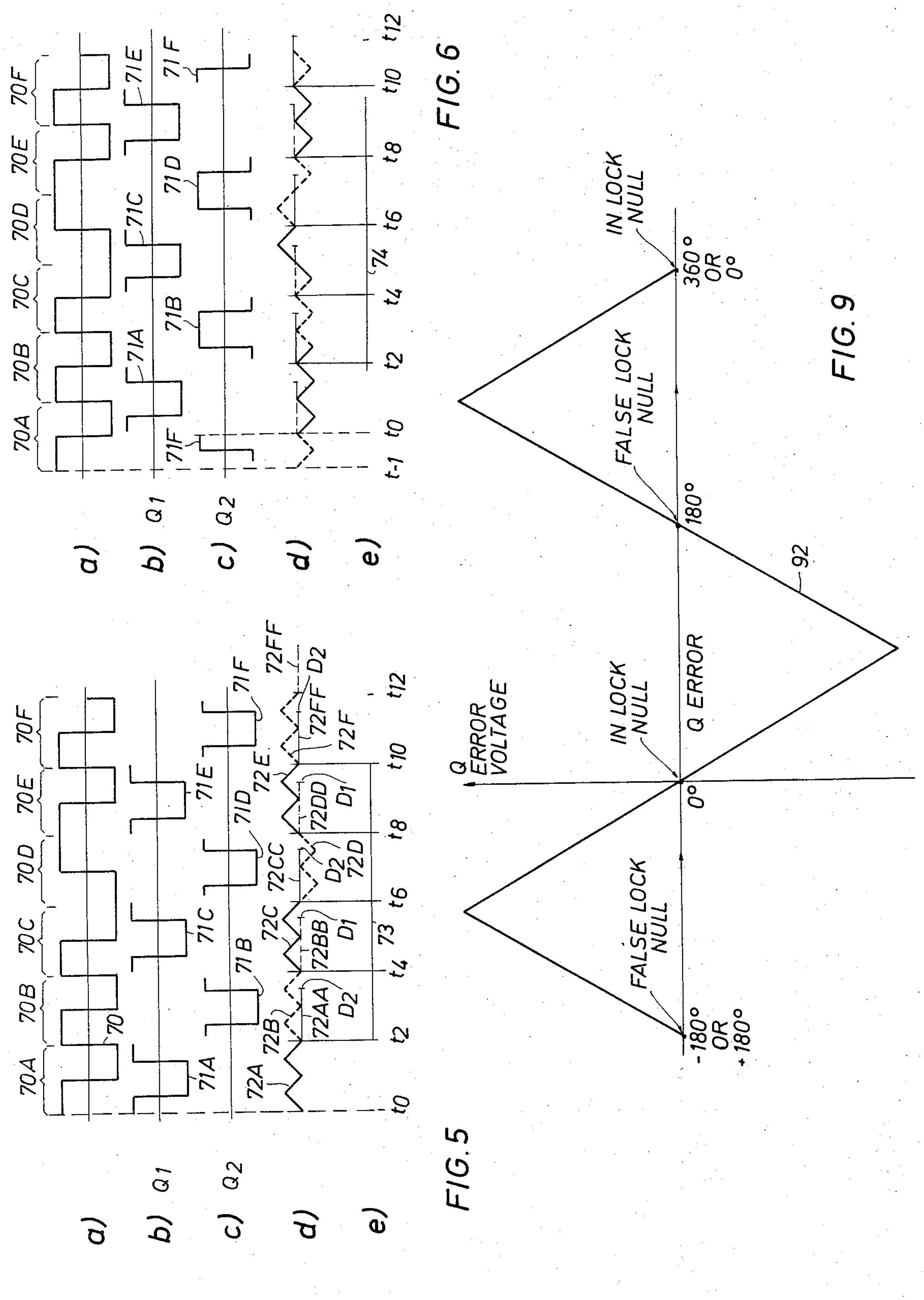
FIGS. 5 and 6 respectively are representations of various signal waveforms for the circuitry of FIG. 3 which are in-phase and 180° out of phase.
FIG. 9 is a plot of phase error signals as a function of phase error between an incoming signal and a generated signal.

For the detection of phase error and to maintain the frequency of the generated signals from the logic circuit 60 at the same frequency as the incoming signals, the incoming signal is multiplied with the quadrature signals $Q_1$ and $Q_2$. For example, in FIG. 5(*a*) an incoming signal 70 is illustrated where the signal has successive bits 70(A–F) which respectively occur during times $t_0$–$t_2$, $t_2$–$t_4$, $t_4$–$t_6$, $t_6$–$t_8$, $t_8$–$t_{10}$, and $t_{10}$–$t_{12}$. In FIG. 5(*b*) the $Q_1$ quadrature signals 71A, 71 C and 71E respectively occur during times $t_0$–$t_2$, $t_4$–$t_6$ and $t_8$–$t_{10}$. In FIG. 5(*c*) the $Q_2$ quadrature signals 71B, 71D and 71F respectively occur during times $t_2$–$t_4$, $t_6$–$t_8$ and $t_{10}$–$t_{12}$. When bit 70A and signal 71 A are multiplied and integrated over the time period $t_0$–$t_2$, a double peaked response 72A is obtained [FIG. 5(d)]. At time $t_2$ the last value of the response is held for about three quarters of the next bit period and is illustrated as 72AA in FIG. 5(*d*). At a time just prior to the time $t_4$, the dump signal $D_2$ discharges the response 72AA in preparation for the next cycle of operation. Similarly, the signal 71C multiplied by signal 70C produces a response 72CC [FIG. 5(d)] which is held during the time period $t_6$–$t_8$ as shown by 72CC. Just prior to time $t_8$, the dump signal $D_2$ discharges the held value as indicated by 72CC. Likewise, the bit signal 71E multiplied by signal 70E produces a response 72EE [FIG. 5(d)] which is held during the time period $t_{10}$–$t_{12}$.

Referring now to FIG. 3, a $Q_1$ multiplier 40 is coupled to the input 19 for the incoming signals and to the logic circuit 60 to receive $Q_1$ signals. The multiplier 40 produces an analog multiplication of the incoming signal with the $Q_1$ signal. The product of the multiplied signals is supplied to the integrate, hold, and dump circuit 41. The timing signal $T_1$, which occurs in phase with the I signals and is keyed to the bit period, initiates and stops the integration. In the bit period immediately following an integration and during the first part of the succeeding bit period, a sampling signal $S_2$ supplied by the circuit 60 to the circuit 42 causes the signal potential existent and held in the circuit at that time to be passed to the switch 43. During the later part of this succeeding bit period, the dump signal $D_2$ from circuit 60 discharges the signal from the hold circuit 42 in preparation for the circuit performing the next integration. The switch 43 is operated by the timing signal $T_1$ to alternately couple the circuits 41 and 51 to a multiplier circuit 44.

Referring back to FIG. 5, the second, alternating $Q_2$ signal as shown in FIG. 5(c) when multiplied by the incoming signal [FIG. 5(a)] similarly produces integration signals 72B, 72D and 72F which are respectively followed by hold signals 72BB, 72DD and 72FF. The signals 72BB, 72DD and 72FF are discharged by dump signals $D_1$ and the sampled signals obtained in response to the sample signals $S_1$ are supplied to the switch 43.

As FIG. 5(*d*) evidences, when the $Q_1$, $Q_2$ and incoming signals are in phase, the sampled output 73 [FIG. 5(e)] is level and the output of the VCO 46 is in frequency and phase synchronization. When the $Q_1$ and $Q_2$ are 180° out of phase with respect to the incoming signal, the frequency of the VCO will still be maintained constant. The reason for this is illustrated in FIG. 6 where the $Q_1$ and $Q_2$ signals of FIG. 6(*b*) and 6(*c*) are shifted 180° with respect to the illustration in FIG. 5. When the signals are multiplied, integrated, and held, the time of sampling occurs just after the times $t_0$, $t_2$, $t_4$, etc., so that a level sample output 74 occurs as shown in FIG. 6(*e*).

Whenever the Q signals and incoming signals are not in frequency and either 0° or 180° phase relationship, there is an error output produced during the sampling period which will produce a change in the frequency of the VCO 46 tending to drive the Q signals toward the frequency of the incoming signal and to a 0° or 180° phase locked condition. The error signal is supplied to the analog multiplier 44 which multiplies the signal by a "0" or "1" value as necessary to maintain the error signal at the same polarity. The "0" or "1" value obtained for the "M" signal is generated by the decoded "0" or "1" values from the I circuit.

Referring now to the I loop system, these are two channels which respectively supply signals to an output decoder circuit and to a false lock detector. The signals in each channel are integrated and the integration values are sampled just before and just after the end of a multiplication and integration operation for a bit period. Each channel is supplied with an in phase coded signal of one bit period duration which alternates with a quiescent period equal to one bit period.

Figures 7, 8:
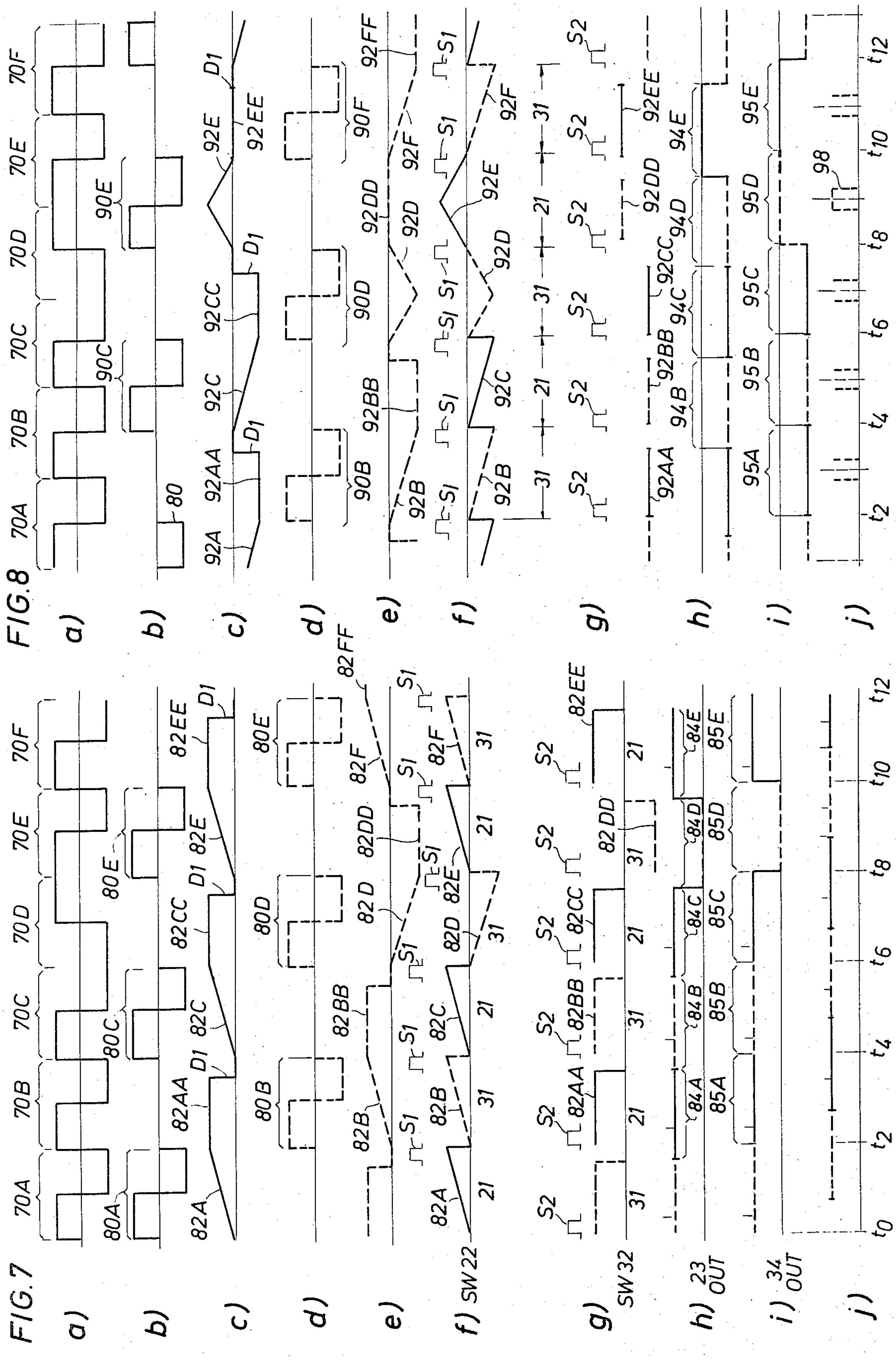
FIGS. 7 and 8 respectively are representations of various signal waveforms for the circuitry of FIG. 3 which are in-phase and 180° out of phase.

Considering the first I loop system, the I multiplier 20 receives the $I_1$ signal [FIG. 7(b)] and the incoming signal [FIG. 7(a)] and passes the analog signal product to an integrate, hold, and dump circuit 21. With reference to FIG. 7, circuit 21 will multiply bits 70A and 80A, 70C and 80C, and 70E and 80E. The multiplication of 70A and 80A results in an integrated signal 82 A between the times $t_0$–$t_2$. At the time $t_2$, the timing signal $T_1$ (the end of a bit period) stops the integration and transfers the signal value 82 A to a hold circuit which provides a held value signal 82AA (at the last integration value) during the times $t_2$–$t_4$ until the dump signal $D_1$ discharges the signal 82AA. At the time $t_4$, the integration signal 82C is initiated and is stopped at time $t_6$ to be followed by a held value signal 82CC which is discharged by the dump signal $D_1$ just prior to the time $t_8$. At the time $t_8$, the integration signal 82E is initiated and is stopped at the time $t_{10}$ and followed by the held value signal 83EE which is stopped by the dump signal $D_1$ occurring just prior to the time $t_{12}$.

In the second I loop system, the I multiplier 30 receives the $I_2$ signal [FIG. 7(d)] and the incoming signal [FIG. 7(a)] and passes the analog signal product to an integrate, hold, and dump circuit 31. Circuit 31 will multiply bits 70B and 80B, 70D and 80D, and 70F and 80F. The multiplication of 70B and 80B results in an integrated signal 82B between the times $t_2$–$t_4$. At the time $t_4$, the timing signal $T_1$ (the end of a bit period) stops the integration and transfers the signal value 82B to a hold circuit which provides a held value signal 82BB (at the last integration value) during the times $t_4$–$t_6$ until the dump signal $D_2$ discharges the signal 82BB. At the time $t_6$, the integration signal 82D is initiated and is stopped at the time $t_8$ to be followed by a held value signal 82DD which is discharged by the dump signal $D_2$ just prior to the time $t_{10}$. At the time $t_{10}$, the integration signal 82F is initiated and is stopped at the time $t_{12}$ and is followed by a held value signal 82EE which is stopped by the dump signal $D_1$.

From the foregoing it will be appreciated that when the $I_1$ and $I_2$ signals are correctly in-phase with the incoming signals, the first I channel during one bit period develops a positive sloped integrated signal for bit values of "1" and a negative sloped integrated signal for bit values of "0" following each integration, and in the succeeding bit period the held value of the integration is either positive for a "1" or negative for a "0" bit value. In the second I channel while an integration value is being held in the first channel, the second channel performs an integration over a bit period. At the end of the bit period for integration in the second channel, the integrated value is held while the first channel begins an integration.

The first channel circuit 21 is coupled by an output 21*a* to a switch 22 and the second channel circuit 31 is coupled by an output 31*a* to the switch 22. The switch 22 is operative for each bit period to be coupled to one of the circuits 21 or 31. The drawings illustrate that if circuit 21 is synced to bits 80A, 80C, etc., then the switch would be alternatively coupled to integration of the signals respectively and alternatively in the first and second channels as illustrated in FIG. 7(*f*). Circuits 21 and 31 are made responsive to a sampling pulse $S_1$ [see FIG. 7(f)] which occurs just prior to the end of a bit period. The sampling pulse $S_1$ and switch 22 cooperate to alternatively pass a sampled signal voltage to the storage circuit 23. The storage circuit 23 is responsive to a sampled pulse to produce a level output until the next sampled input signal. As shown in FIG. 7(*h*), a signal 84A results from the sample taken at the time $S_1$ from signal 82A [FIG. 7(f)]. In FIG. 7(*h*), the signals 84B, 84C, 84D and 84E correspond to sampled signals 82B, 82C, 82D and 82E. As would be expected, at the sampling time just prior to the time $t_8$, the signal 82D is negative and a negative response occurs. This response is indicative of an "0" bit and the detection is at the end of the bit period for the "0" bit.

The second channel circuit 31 is coupled by an output 31*b* to a switch 32 and the first channel circuit is coupled by an output 21*b* to the switch 32. The switch 32 is operative for each bit period to be coupled to one of the circuits 21 or 31 by virtue of the input switching pulse $T_1$. The drawings illustrate that if circuit 31 is synced to bits 80B, 80D, etc., then the switch would be alternately coupled to the held values of the signals occurring in the bit period immediately following integration.

Switch 32 alternatively couples the held signal values from the first and second channels as illustrated FIG. 7(*g*). Circuits 21 and 31 are made responsive to a sampling pulse $S_2$ [see FIG. 7(g)] which occurs just at the start of a bit period. The sampling pulse $S_2$ and switch 32 cooperate to alternatively pass a sampled signal voltage to a storage circuit 34 which outputs to the false lock detector circuit 33. The detector circuit 33 is responsive to the voltage signal sampled by the pulse $S_1$ and the voltage signal sampled by the pulse $S_2$.

As shown in FIG. 7(*g*), the held value signals 82AA, 82BB, 82CC, 82DD, etc. are respectively available to switch 32. At the sampling time $S_2$ in the bit period immediately following the bit period of integration, the sampled and held potential is passed through the switch 32 at the signal levels illustrated by the signals 82AA, 82BB, 82CC, and 82DD and so forth. As evidenced by FIG. 7(*i*), the signal 85D is relatively negative as the held sample value is relatively negative. The signals as represented by FIGS. 7(*h*) and 7(*i*) are supplied to the false lock detector 33. Detector 33 operates on the principle that if the relative value of the input signals is the same, there is no output. An input sampling pulse $S_3$ occurring at the midpoint for a synced signal samples the input signales to the detector 33. Thus, for each of the sampling periods $S_3$ as shown in FIG. 7(*j*), the inputs have the same relative values and there is no output from the detector 33 which is indicative of the correct in phase relationship of the I and incoming signals.

Referring now to FIG. 8, an example is given where the incoming signal is 180° out of phase with respect to the I generated signal. The I signals shown in FIG. 8(*c*) and FIG. 8(*d*) are shifted to the left by 180°. Thus, multiplication and integration of the product of signal bit 90B with the last bit half of bit 70A and the first bit half of bit 70B provides the waveform 92B as shown in FIG. 8(*e*). Multiplication and integration of the product of signal 90D with the last bit half of signal bit 70C and the first bit half of signal bit 70D produces a "V" shaped integration signal 92D. Multiplication and integration of the product of signal 90D with the last bit half of signal bit 70C and the first bit half of signal bit 70D produces a "V" shaped integration signal 92D.

Multiplication and integration of the product of signal 90F with the last bit half of signal bit 70E and the first bit half of signal bit 70E produces the negatively sloped waveform 92F as shown in FIG. 8(*e*). The multiplication and integration of the product of signal 90E with the last half bit period of signal 70D and the first half bit period 70E results in a rooftop shaped integration signal 93E, as shown in FIG. 8(*c*). As illustrated in FIG. 8(*f*), switch 22 will see the alternate integrations while in FIG. 8(*g*), the held values of the signals to switch 32 are illustrated. At the sample times $S_1$ for FIG. 8(*f*), the storage circuit 23 produces signals 94–94E as shown in FIG. 8(*h*), for example. At the $S_1$ sample time just prior to the time $t_8$, the signal 92 D is negative and at the sample time $S_1$ just prior to time $t_{10}$, the signal 92E is positive. Signal 92E accordingly produces a positive output 94E from the circuit 23. At the sample times $S_2$, signals 95A–95E [FIG. 8(i)] are produced by the storage circuit 34. The signal 95D is positive because at the time $t_8$ the signal 92DD is at zero potential. Signal 95E is also positive because at the $S_2$ time following the time $t_{10}$, the signal 92EE is at zero potential. The detector 33 produces an output pulse 98 at a time $t_9$ because the sample pulse $S_3$ finds the signal 95D positive relative to the signal 94D. At the time $t_{10}$ both signals 94E and 95E are positive and no output is produced by the detector 33.

Referring now to FIG. 9, a plot of the error voltage developed by the Q loop systems as a function of phase error is illustrated. At 0° and 180°, the error represented by the error 99 is nulled at a zero output. As the phase error increases to 90° to 270°, the error output sensitivity increases. From this it can be appreciated that the magnitude of the correction signal to the VCO 46 is a function of phase error.

In the operation of the present invention, incoming split phase coded signals are supplied to each of the I multiplier circuits 20 and 30 and each of the Q multiplier circuits 40 and 50. By definition, the incoming signals are either "1" and "0" values dependent upon whether the first half of the signal for a bit period is positive or negative. The generated signals consist of I signals which are representative of a "1" value and Q signals which are representative of an I signal shifted in phase by 90°. Two channels are arranged to operate alternately and provide an error control signal for controlling the frequency of the generated signal from the VCO 46 relative to the incoming signal and to null the generated and incoming signals in either a 0° or 180° locked relationship whenever the frequencies are equal.

The frequency control is obtained by multiplying the incoming signal in a first channel by a first series of generated O signals which occur every other bit period, integrating each multiplication and holding the existent value of the integration at the end of each bit period during which the multiplication step occurs. In the quiescent bit period following the multiplication and integration, the held value is sampled for the first channel. The incoming signal is also multiplied in a second channel by a second series of generated O signals which occur every other bit period in alternation with the first series of signals. The multiplication product in the second channel is integrated over the bit period, and at the end of this bit period the existent value of the integration is held during the following quiescent bit period. During this quiescent bit period, the held value is sampled for the second channel. If the incoming and Q signals have the same bit period, i.e., the same frequency, and are in either 0° or 180° phase locked condition, the held value output will be constant.

If the incoming signal and Q signal shift phasewise from the null conditions at 0° and 180°, the held value during the quiescent periods increases or decreases as a function of the relative lead or lag of the signals. Similarly, if the signals have different frequencies, there will be a phase difference which produces a correction error output. The VCO 46 changes the frequency until the frequencies of the incoming signal and Q signals are in phase.

Whenever the incoming signals and Q signal are at the same frequency, the signals can lock-up at either a 0° or 180° phase relationship of the incoming and I signals without shifting the frequency output of the VCO 46. At this condition point of operation, the incoming signal is multiplied in a first I channel by a first series of alternately in phase generated I signals which occur every other bit period. The multiplication produce during the bit period that the I signal occurs is integrated over this bit period. During this bit period, the integration signal is supplied to a first switch 22 and to a second switch 32. Just prior to the end of this bit period, a sample signal is taken at time $S_1$ and passed by the first switch circuit 22 to a storage circuit 23. At the end of this bit period, the first switch 22 is disconnected from the first I channel and connected to the second I channel. Also, at the end of the described bit period, the second switch 32 transfers the last stored or held integration value of the signal during the following quiescent bit period. Just after the initiation of the next following period, a sample signal is taken at a time $S_2$ of the held value of the signal and this signal is passed to the false lock detector 33.

Essentially, what is occurring is that with regard to a synced I signal, a sample is taken just before and just after the time at which a timing signal occurs. If the incoming signal is at the same frequency and phase relationship, then the integrated and held values of the generated and incoming bit are similar and the detector produces no phase correction output signal. If, however, a phase difference occurs then the sampled signals produce a differential which causes the detector 33 to operate the flip-flop 49 and change the phase of the timing signals by 180°.

In brief summary of the system embodying the present invention, there is a signal generating means which includes the VCO 46, the divide by two circuit 47, the exclusive OR circuit 48, and the ring binary counter and logic means 60. To control the VCO 46, parallel channels receive the incoming inputs of data word phase coded signals and multipliers 40 and 50 respectively combine generated signals from the logic means 60 with the incoming signals. Switch means 43 provide successively occurring error output signals whenever the signals are not in a phase-locked condition, the error signals serving to adjust the VCO 46 so that the frequency and phase output of the logic means 60 are adjusted to that of the incoming signals and the signals will lock up on eiter a 0° or 180° condition.

In the decoding loop circuit there are parallel electrical channels respectively having multipliers 20 and 30 for combining incoming inputs of data word signals with generated I signal from the logic means 60. Because the I signals alternately occur, each of the circuit means 21 and 31 integrates a combined signal for one time frame and holds the integrated value during the succeeding time frame. The switch 22 provides a first series of interleaved data signals which are keyed to timing signals occurring just before the start of a time frame. The switch 32 provides a second series of interleaved data signals which are keyed to timing signals occurring just after the start of a time frame. The two outputs of the switches 22 and 32 are received by a false lock detector means 33 and a sampling time intermediate of a time frame determines if the incoming and generated I signals are in phase or 180° out of phase. If out of phase, then the detector means 33 controls the generating means by changing the output of the OR circuit 48 by 180°.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. In a data processing system which receives incoming data word signals comprised of bits, each bit having a phase code modulation characteristic indicative of a digit value, means for demodulating said word data signals and for synchronizing the bits of an incoming data word relative to the phase code modulation characteristic including:

means for generating phase coded signals representative of a given digit value, first means including first parallel electrical channels for respectively combining incoming inputs of data word phase coded signals representative of bit values with said generated signals, and for providing error output signals whenever said combined signals are not in a phase-locked condition, said generating means being responsive to said error output signals to adjust said generated signals toward a phase-locked condition for said combined signals, second means including second parallel electrical channels for respectively combining incoming inputs of data word phase coded signals representative of bit values with said generated signals, and for providing first and second series of interleaved data signals, said interleaved data signals respectively being a function of alternately occurring bits of said data word signals, means for sampling said interleaved data signals at given times within each time frame for a bit for determining the presence or absence of a 0° phase-locked condition, and for controlling said generating means so that the phase of said generated signals is locked to a 0° phase-locked condition with respect to said incoming input signals.

2. The system of claim 1 wherein said combining means in said second channels are analog multiplier means and said second means includes switch means for providing said first and second series of interleaved data signals.

3. The system of claim 2 wherein said channel means further including means for integrating the output of said multiplier means, means for limiting the integration time in each channel to a time frame for bit, means for retaining an integration signal during a time frame succeeding an integration time frame.

4. The system of claim 3 wherein said combining means in said first channels are analog multiplier means, and said first means includes switch means for providing successively occurring error output signals whenever said combined signals are not in a phase-locked condition.

5. The system of claim 4 wherein said sampling means further including means for receiving said two outputs and wherein said sampling times intermediate of a time frame for a bit are keyed for determining the phase-locked condition.

6. The system of claim 5 wherein said means for receiving said two outputs provides a phase change signal generating means for changing the phase of said generating signals by 180°.

7. In a data processing system which receives incoming data word signals comprised of bits, each bit having a phase code modulation characteristic indicative of a digit value, means for demodulating said word data signals and for synchronizing the bits of an incoming data word relative to the phase code modulation characteristic including:

first loop means including means for receiving income data word signals and for generating data signals representative of a given digit value, said first loop means including means for locking the generated data signal to said incoming word signals in either a 0° or 180° phase relationship, second loop means for combining income data word signals and said generated data signals for providing a first and second series of combined signals, said first series of combined signals comprising first alternately occurring bit values, said second series of combined signals representing second alternately occurring signals representative of second alternately occurring bit values, means for sampling said combined signals during each time period for a bit value for providing sample signals, means for comparing said sampled signals from first and second series of signals and for providing phase adjustment signals to said first loop means for maintaining the incoming data word signals in a 0° locked phase relationship with respect to said generated data signals.

8. The system of claim 7 wherein the second loop means includes parallel electrical channels each including multiplier means, means responsive to the output of said multiplier means for integrating the multiplier output for each time period for a bit value and for holding an integrated value during a succeeding time period for such a bit value.

* * * * *